United States Patent [19]
Talbott, Jr.

[11] 4,181,027
[45] Jan. 1, 1980

[54] NODAL/MODAL CONTROL AND POWER INTENSIFICATION METHODS AND APPARATUS FOR VIBRATION TESTING

[75] Inventor: Charles F. Talbott, Jr., Chatsworth, Calif.

[73] Assignee: Hughes Aircraft Company, Culver City, Calif.

[21] Appl. No.: 897,822

[22] Filed: Apr. 19, 1978

[51] Int. Cl.² .......................................... G01N 29/00
[52] U.S. Cl. ..................................................... 73/665
[58] Field of Search ................. 73/665, 663, 664, 666, 73/667, 668

[56] References Cited

U.S. PATENT DOCUMENTS

| | | | |
|---|---|---|---|
| 3,646,807 | 3/1972 | Gray et al. | 73/665 |
| 3,686,927 | 8/1972 | Scharton | 73/665 |

*Primary Examiner*—Jerry W. Myracle
*Attorney, Agent, or Firm*—Lewis B. Sternfels; W. H. MacAllister

[57] ABSTRACT

Controllability and performance of resonating, compliant, simply excited, self-attenuating driving and driven sets of structures coupled to pneumatic vibrators is usefully enhanced by means of altering mode shapes by forcibly creating nodes and partial nodal lines and by means of intensifying power transmitted to test items by forcibly increasing acceleration transmissibility. These devices, when included in a vibration system, enable different test items to be vibration tested at selectable repeatable levels under controlled conditions of multi-frequency, multi-degree-of-freedom acceleration history, to achieve a frequency spectrum and acceleration-level control of a broadband quasi-random vibration output. Specific design of the size, mass, and resonant behavior of the driving and driven structure sets with appropriate transmissibility characteristics of the elastomeric interface results in controlled multi-modal, uniform RMS acceleration, multi-degree-of-freedom, frequency-bounded vibration testing. In a first embodiment, points or regions on vibration device structures forcibly are constrained to form nodes by localized immobilization of the driving structure and/or localized stiffening of the elastomer coupling between driving and driven structure and, thereby, to decrease relative displacement between driving and driven structures at these points. Further increase or decrease of modal density and change of test RMS acceleration levels are achieved by altering the transmissibility of power through the elastomer coupling by mechanically compacting or extending the elastomer by preloading.

31 Claims, 25 Drawing Figures

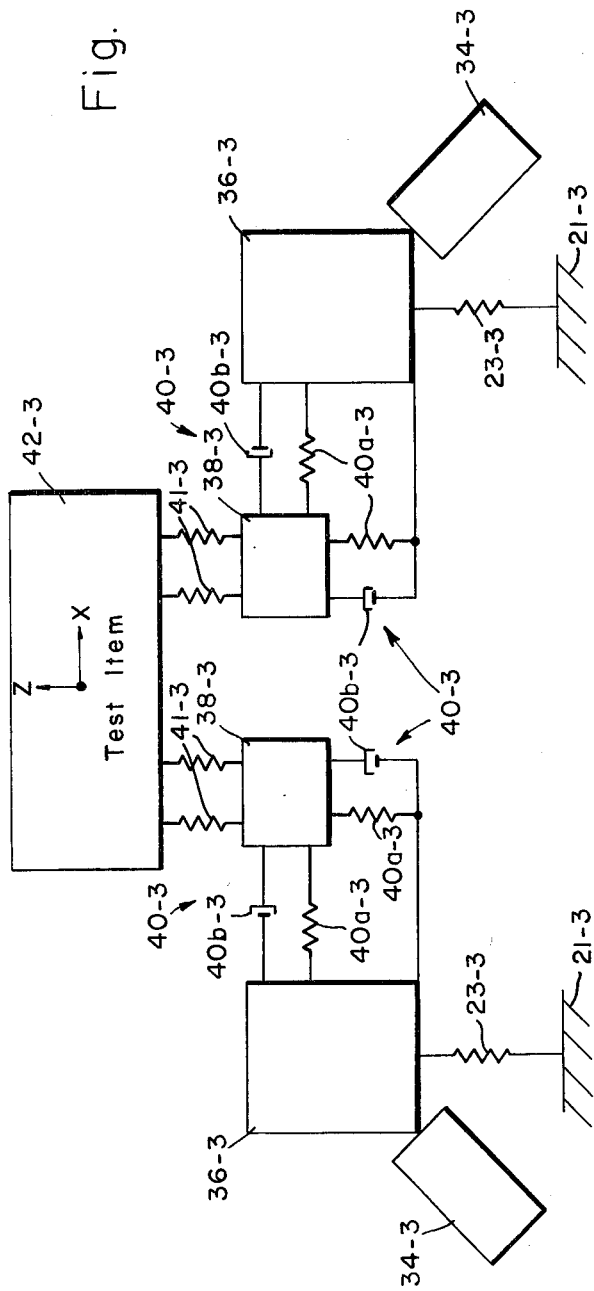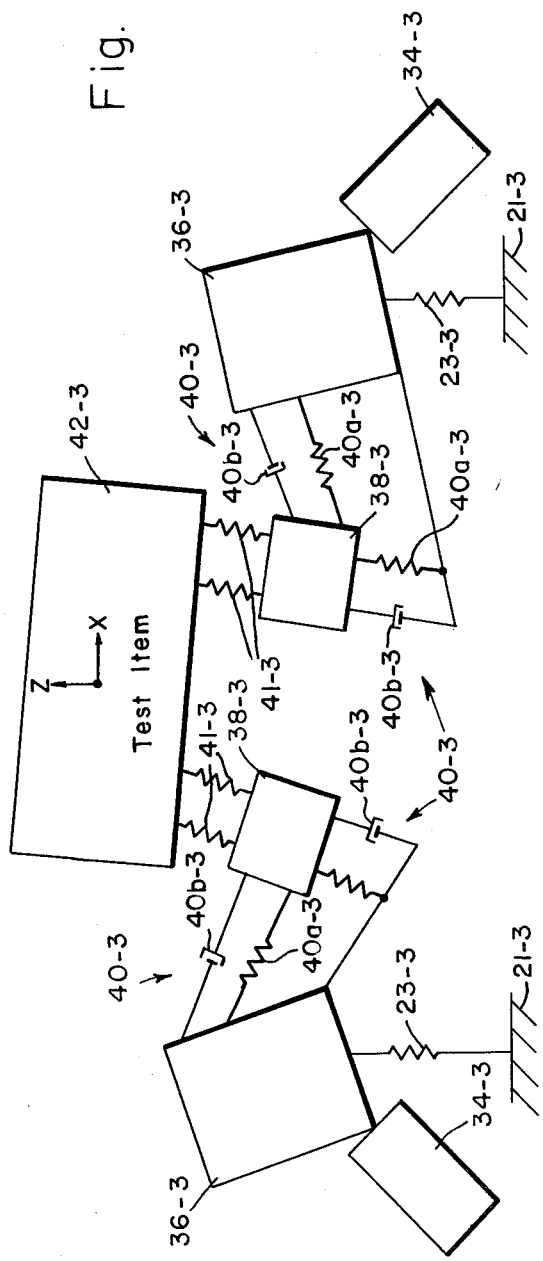

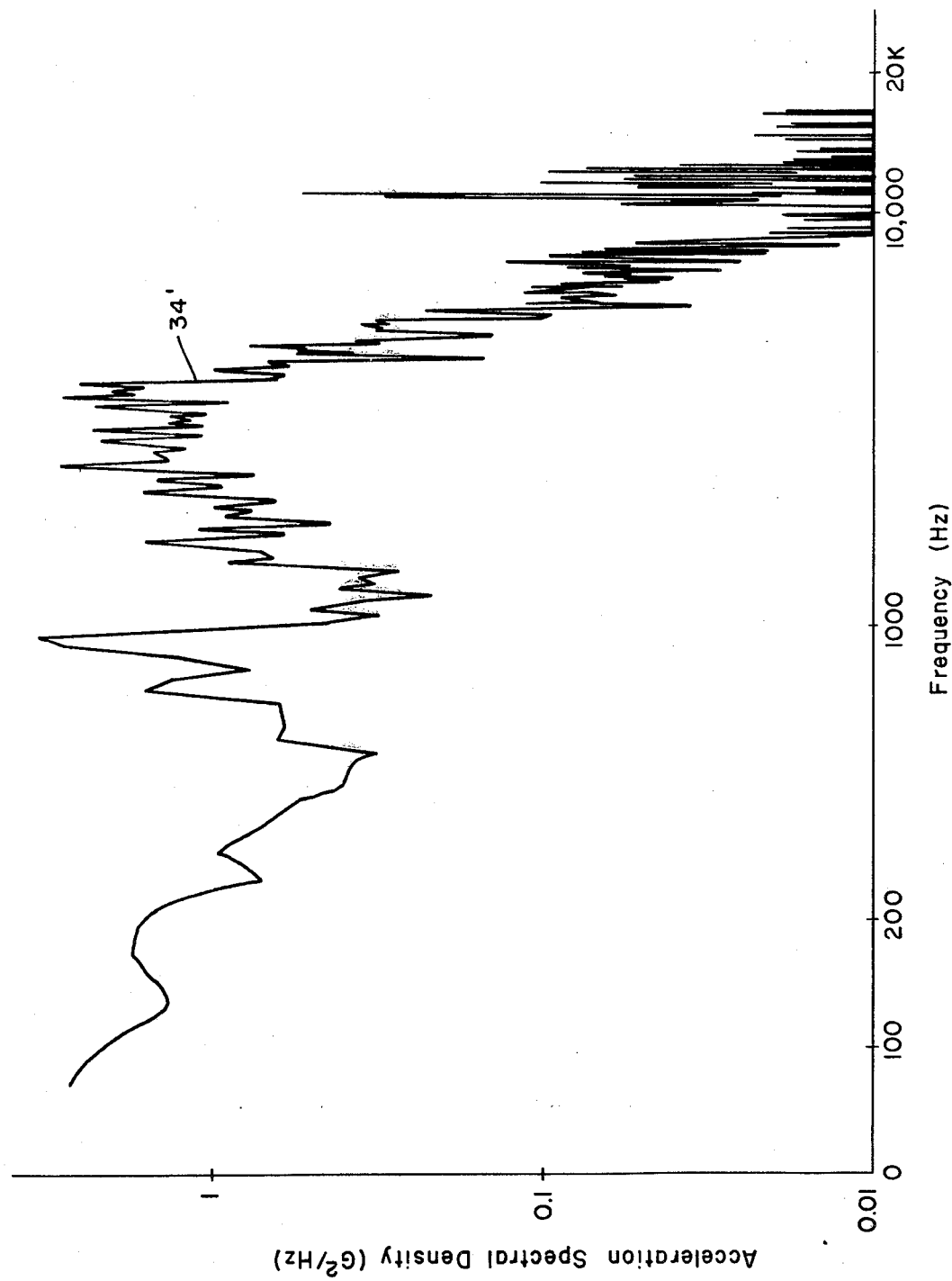

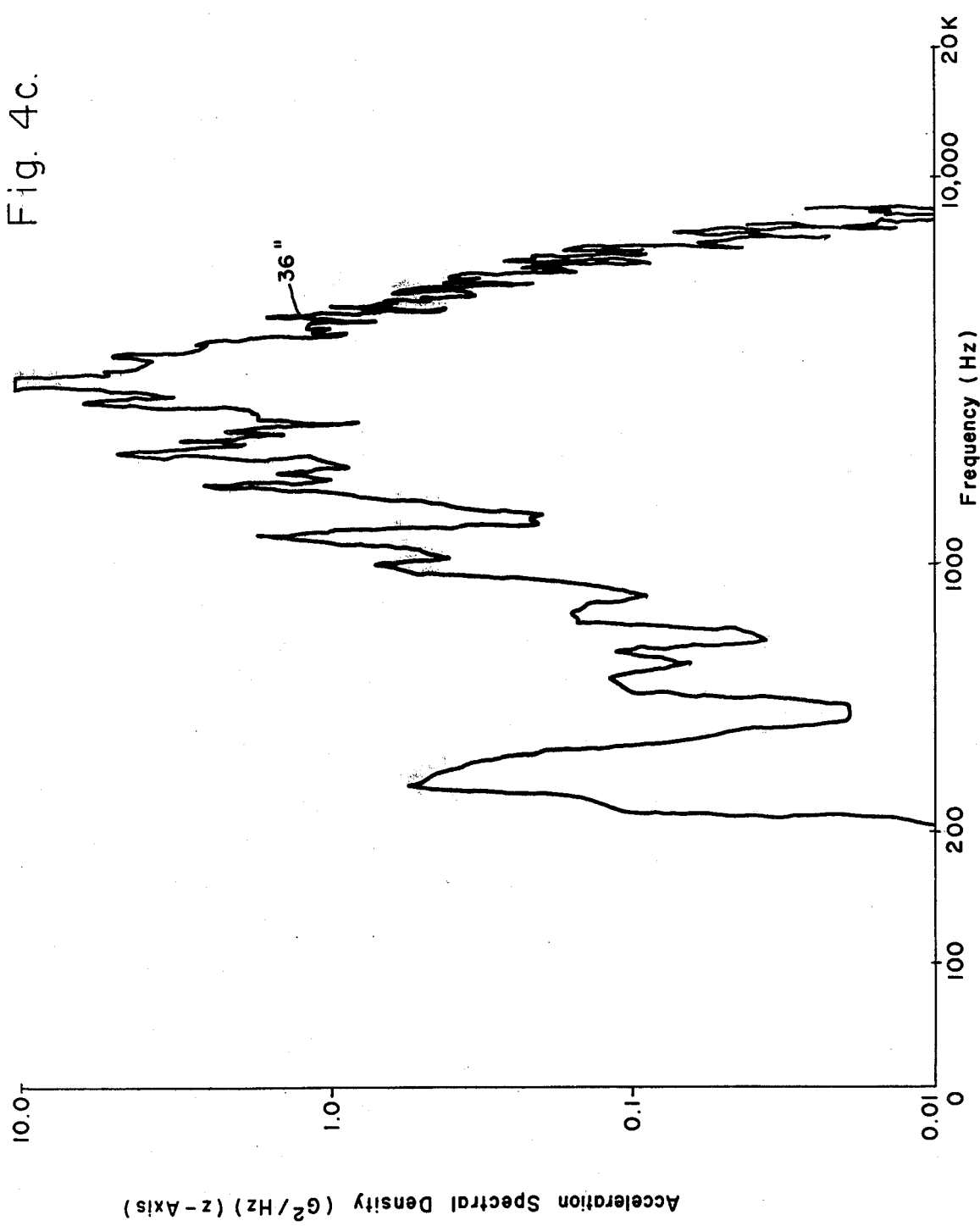

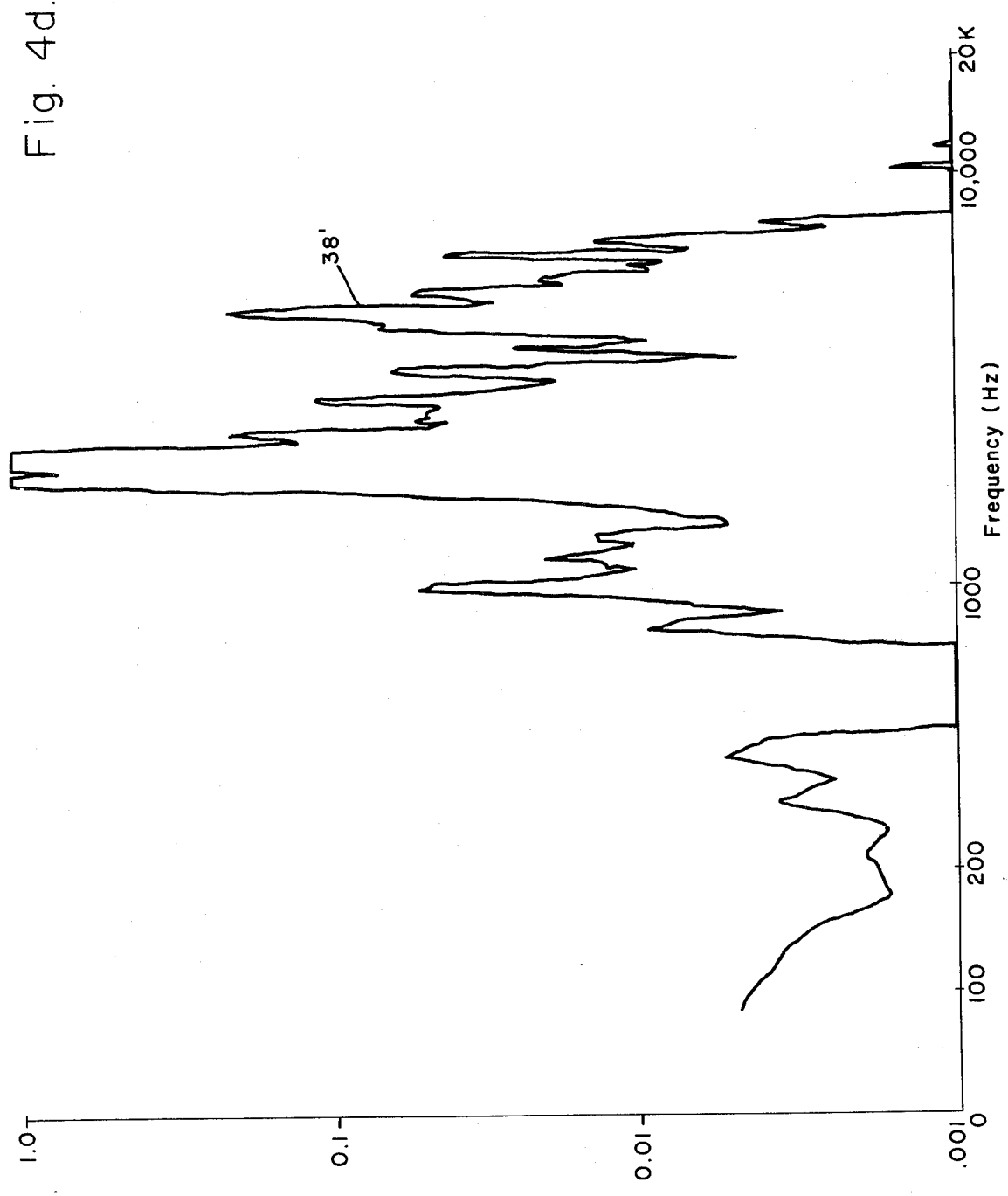

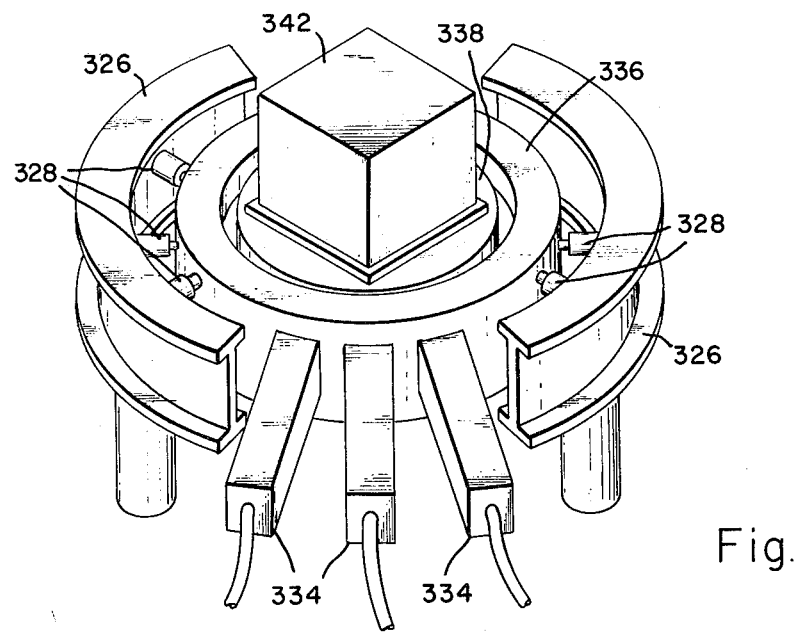
Fig. 11.
Fig. 12.
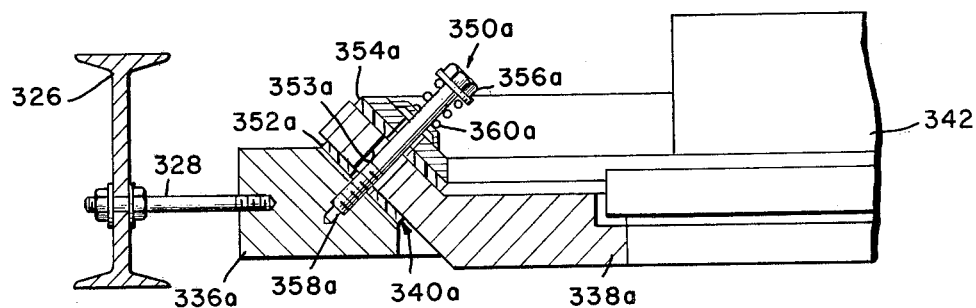
Fig. 13.
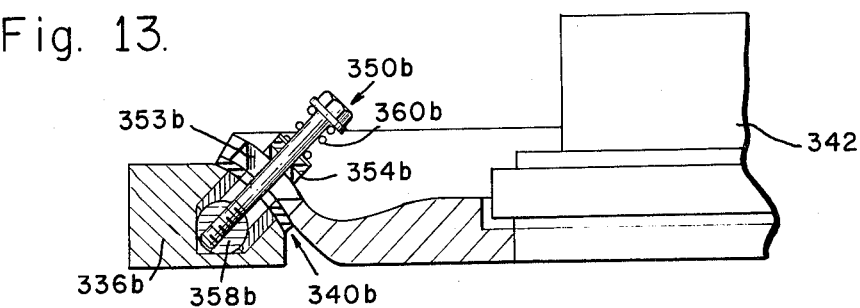

NODAL/MODAL CONTROL AND POWER INTENSIFICATION METHODS AND APPARATUS FOR VIBRATION TESTING

BACKGROUND OF THE INVENTION

1. Field of the Invention

The present invention relates to vibration test equipment employing vibrators and, in particular, to means and methods for usefully enhancing the controllability and performance of such vibrators.

As used herein, the terms "quasi-random" and "pseudo-random" are defined as follows. "Quasi-random" vibration can be described as a line spectrum with equally spaced lines, e.g., harmonics, whose fundamental frequency varies randomly with time within a restricted frequency range, e.g., vibrator frequency excursion during modulation, which, in turn, causes a random fluctuation in the amplitudes, (e.g., accelerations) at the spectral lines. The funadamental frequency fluctuates sufficiently to produce an essentially continuous spectrum when averaged over a long enough time interval. By "pseudo-random", it is meant that there is a mathematical method or algorithm for selecting a sequence of numbers, e.g., for use in modulating the driving means for the vibrators. "Pseudo" means that the randomness is not purely random because the sequence results from predetermined calculations.

Also, as used herein, the terms "multi-degree-of-freedom", "spectrum" and "multi-modal" are defined as follows. "Multi-degree-of-freedom" is used to define the ability of structure to translate and rotate in several directions simultaneously within given bounds. "Spectrum", e.g., as in "intense vibration spectrum", means the cumulative time history of the vibration (e.g., in $G^2/Hz$) as related to the frequency associated with a particular level of vibration. "Multi-modal" means the simultaneous occurrence of many structural vibrational modes, or dynamic displacements.

As further used herein, a "node" is defined as a place of relative zero motion for a particular mode of vibration. Many nodes characterize higher modes and, hence, higher frequencies of vibration. A "nodal line" is defined as a connected series of nodes. A "partial node" or "partial nodal line" is defined as a node or nodal line wherein fixity is not absolute.

2. Description of the Prior Art in Background Considerations

While the present invention was devised particularly to usefully enhance the controllability and performance of mechanical vibration devices of a kind described in co-pending patent applications "Quasi-Random Pneumatic Vibration Facility and Automatic Frequency Modulating System Therefor" (Ser. No. 897,821) by Henry T. Abstein, Jr., Dennis B. Page, James M. Kallis, Charles F. Talbott, Jr. and Richard L. Baker; "Multi-Axis, Complex Mode Pneumatically Actuated Plate/Space Frame Shaker for Quasi-Random Pneumatic Vibration Facility" (Ser. No. 897,823) by Charles F. Talbott, Jr; "Multi-Axis Complex Mode Pneumatically Actuated Annular Frame Shaker for Quasi-Random Pneumatic Vibration Facility" (Ser. No. 897,824) by Charles F. Talbott, Jr, all filed herewith, it is to be understood that the present invention is as useful when it is required that vibrational energy is transferred between driving and driven structures. Nevertheless, because the present invention was devised for a specific problem, for ease in describing the present invention, reference will be made thereto.

In the above mentioned applications, in particular, Ser. No. 897,824 and Ser. No. 897,823, vibration testing of hardware under controlled conditions of multi-frequency, multi-degree-of-freedom acceleration history is achieved by special coupling of externally excited driving and driven sets of structure. The driving set responds to an intense vibration spectrum, created by attached pneumatic vibrators, with multi-modal forced and resonant frequencies in limited directions. The driven set of structure, holding the test hardware, responds with forced and harmonic oscillations to a modulated vibration field transmitted from the driving structure set through a specially designed elastomeric path. Specific design of the size, mass, and resonant behavior of the driving and driven structure sets, with use of appropriate transmissibility characteristics of the elastomeric interface, results in the vibration, measured in acceleration spectral density (G/Hz) versus frequency (Hz).

It is desired that the acceleration spectral density exhibit desired characteristics over a specified frequency. For vibration testing of a type contemplated in the above-mentioned co-pending applications, it is desired that the structure be excited in as many translational and rotational vibration modes as is possible, dominated by multiples of both the excitation frequency and natural frequencies of the structure, with a rich composition of vibratory modal history arising from superposition of both individual and unified structural behavior. The visco-elastic frequency/displacement filtering characteristics of the chosen elastomers allow a roll-off of the vibration power spectrum input to the test article at or near the upper frequency limit, regardless of the high frequency content cited in the driving structure.

The elastomers are chosen for particular conditions of achieving desired Grms levels and spectra for a given set of generally common mass and stiffness characteristics of the test items, over a practical pressure range for the driving means.

When the driving and driven structures are secured together with the chosen elastomeric coupling therebetween, the structural design becomes fixed, resulting in a particular acceleration spectral density versus frequency characteristics. It is unlikely that such characteristics are those which are completely desired when significant changes in test item mass and stiffness are necessary; therefore, it is necessary to disassemble the structure and modify the elastomeric coupling so that it becomes more or less resilient at one or more positions between the driving and driven structures. The result of such assembly, testing, disassembly, re-assembly, retesting, etc. is one obviously of trial and error, with great expenditure of time and at great cost. Heretofore, however, it was only through trial and error that acceptable acceleration spectral density versus frequency could be obtained.

SUMMARY OF THE INVENTION

The present invention is directed to solve these problems or overcome the above-mentioned limitations by usefully enhancing the controllability and performance of mechanical vibration devices coupled to resonating, compliant, simply excited self-attenuating driving and driven sets of structures such as described in above-referenced co-pending patent applications, Ser. No.

897,824 and Ser. No. 897,823. These devices, when included in a vibration system, enables a test item to be vibration tested under controlled conditions of multi-frequency, multi-degree-of-freedom acceleration history, to achieve a frequency spectrum and acceleration-level control of a broadband quasi-random vibration output in the frequency range, for example, from 40 Hz to 2 kHz for vibration testing of equipment with a wide latitude for test unit mass and stiffness properties. The driving set of structure responds to an intense vibration spectrum, created by attached vibrators, with multi-modal forced and resonant frequency in multiple directions. The driven set of structure, holding the test hardware, responds with forced and harmonic oscillations to a modulated vibration field transmitted from the driving structure set through a specially designed elastomeric path. Specific design of the size, mass and resonant behavior of the driving and driven structure sets with appropriate transmissibility characteristics of the elastomeric interface results in controlled multi-modal, uniform RMS acceleration, multi-degree-of-freedom, frequency-bounded vibration testing. In a first embodiment, points, or regions on vibration device structure are forceably constrained to form modes by a localized stiffening of the elastomer coupling to decrease relative displacement between driving and driven structures at these points. Stiffening can be static or dynamic depending upon whether mechanical or pneumatic pressure is applied. Further increases or decreases of modal density and change of test RMS acceleration levels are achieved by altering the transmissibility of power through the elastomer coupling by mechanically compacting or extending the elastomer by preloading.

It is, therefore, an object of the invention to provide a means for precisely controlling the vibration environment under which a test item is vibration tested.

Another object is to provide for a test method operable under conditions of controlled frequency bandwidth, variable modal density, and multi-directional acceleration history with uniform RMS acceleration levels in specified directions.

Another object is to provide for multi-dimensional testing with translational and rotational controlled RMS acceleration one, two or three orthogonal axes.

Another object is to provide for simultaneous multi-axial broadband quasi-random vibration.

Another object is to provide for control of a vibration system which, in comparison with conventional systems, is of small cost.

Another object is to provide for such a controlled vibration system which is readily adaptable to a wide range of product sizes and shapes.

Another object is to provide for a compact, self-contained system which requires control only by normal shop air and electrical power.

Another object is to provide for a simple and inexpensively maintainable system.

Other aims and objects as well as a more complete understanding of the present invention will appear from the following explanation of exemplary embodiments and the accompanying drawings thereof.

BRIEF DESCRIPTION OF THE DRAWINGS

FIG. 2 and FIGS. 3a and 3b schematically depict the energy transform in the shaker table assemblies respectively of FIGS. 7–10 and FIGS. 11–16 from the pneumatic vibrators, through the driving, elastomeric, and driven structures, and to a test item, with representative frequency curves therefor, shown in FIGS. 4a–4f, in which correspondence to indicia in FIG. 1 is designated in FIGS. 2 and 3 respectively with "-2" and "-3";

FIGS. 7–10 and FIGS. 11–16 respectively illustrate first and second embodiments of the shaker table assembly useful in the system of FIG. 1 and including further specific embodiments and variations of the energy transform system depicted in FIGS. 2 and 3 and useful in the first and second embodiments.

DESCRIPTION OF THE PREFERRED EMBODIMENTS

Figure 1:
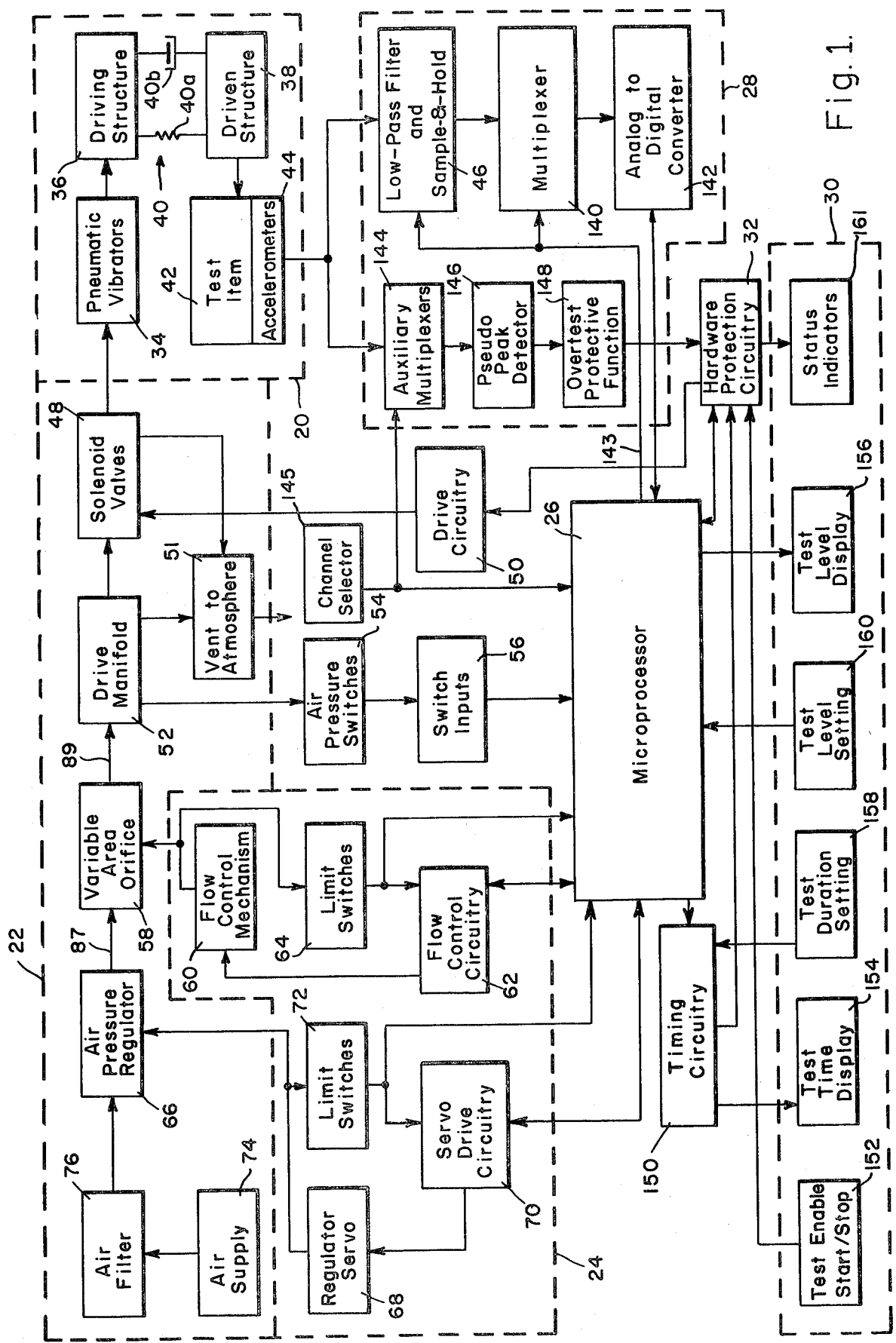
FIG. 1 illustrates in block diagram the overall facility and modulating system therefor for which the present invention was specifically designed.

Referring now to FIG. 1, a vibration system, which is more fully disclosed in copending patent application Ser. No. 897,821 filed herewith, entitled "Quasi-Random Pneumatic Vibration Facility and Automatic Frequency Modulating System Therefor," by Henry T. Abstein, Jr., Dennis B. Page, James M. Kallis, Charles F. Talbott, Jr. and Richard L. Baker, is illustrated as being subdivided into several major subsystems. These subsystems include a shaker table assembly 20, an air pressure and flow control mechanism 22 pneumatically coupled to shaker table assembly 20, air pressure and flow control drive circuitry 24 coupled to mechanism 22 for regulating the pressure level and quantity of air delivered therethrough, a microprocessor 26 coupled to air pressure and flow control mechanism 22 for insuring that the pressure level and quantity of air delivered to shaker table assembly 20 is sufficient for driving the same, a feedback and over-test protective subsystem 28 electrically coupled between shaker table assembly 20 and microprocessor 26 to insure that the microprocessor is provided with the necessary feedback information to properly function, operator interface subsystem 30 for enabling an operator to establish the proper test parameters as well as to be informed thereof, and hardware protection circuitry 32 interposed between microprocessor 26 and drive circuitry 50 for "ON-OFF" solenoid valves 48 in air pressure and flow control mechanism 22 to protect the system from excessive vibrational levels that might otherwise injure the device being tested. Air pressure switches 54 and switch inputs 56 couple a drive manifold 52 in mechanism 22 to microprocessor 26.

In initially describing the system operation, the output of shaker table assembly 20 with a test item thereon is fed back through subsystem 28 and compared with a preselected vibrational setting in microprocessor 26 to generate an error signal which, in turn, is applied through air pressure and flow control circuitry 24 to air pressure and flow control mechanism 22. Mechanism 22 then causes structure in shaker table assembly 20 to vibrate a specimen in a controlled manner, and the shaker's vibratory output is fed back as described above.

Figure 2:
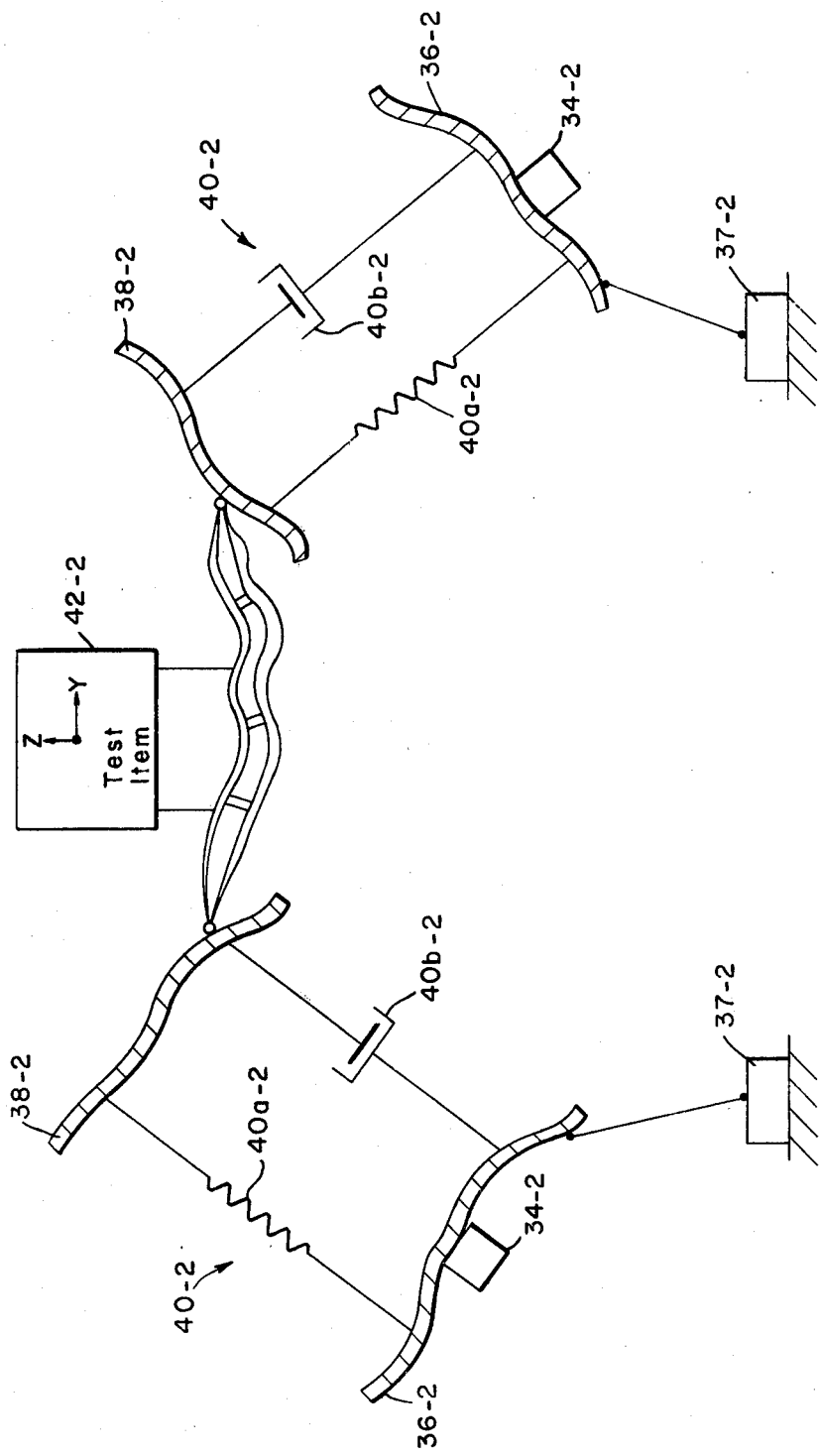
Figure 4B:
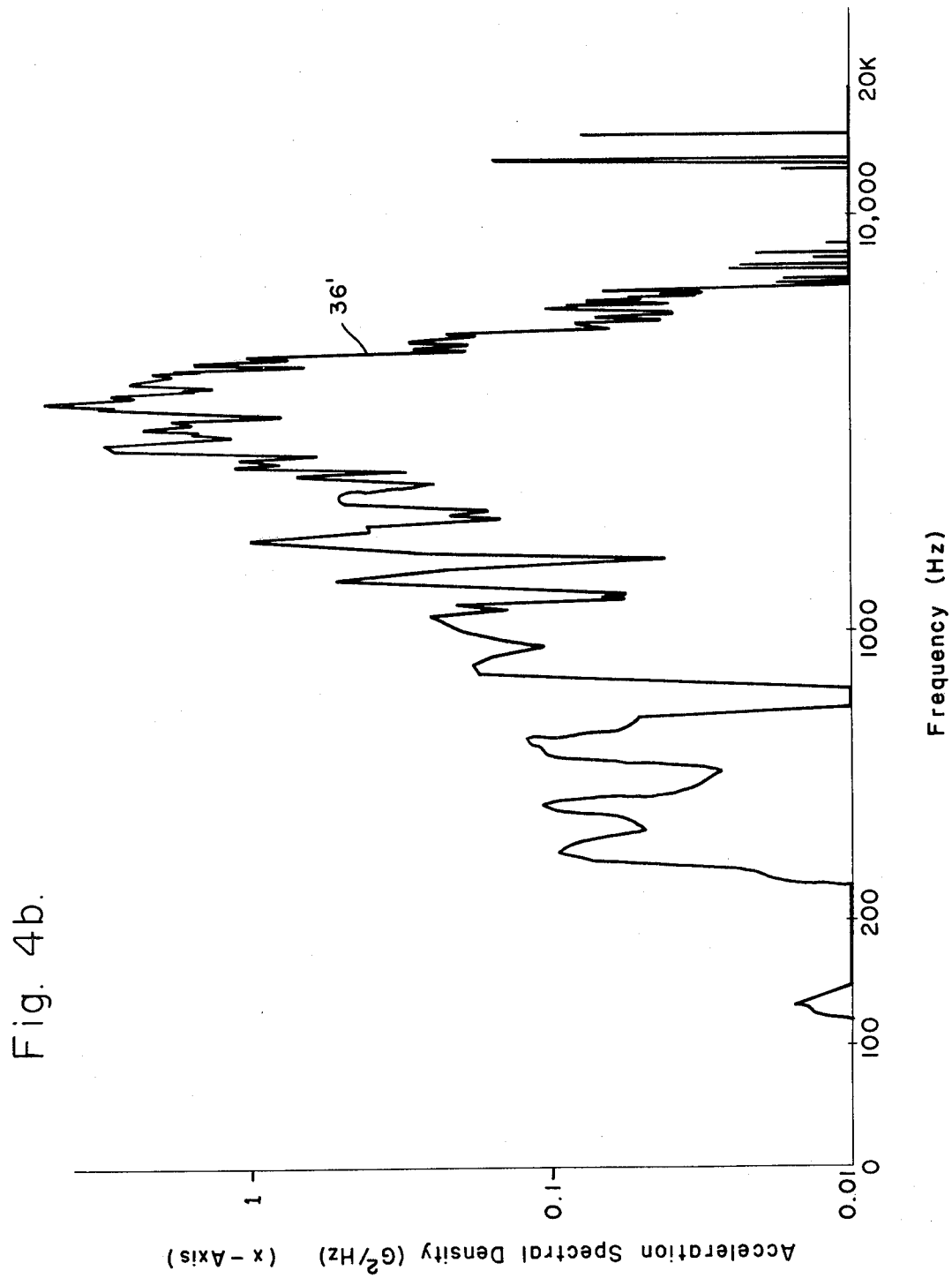
Figure 4E:
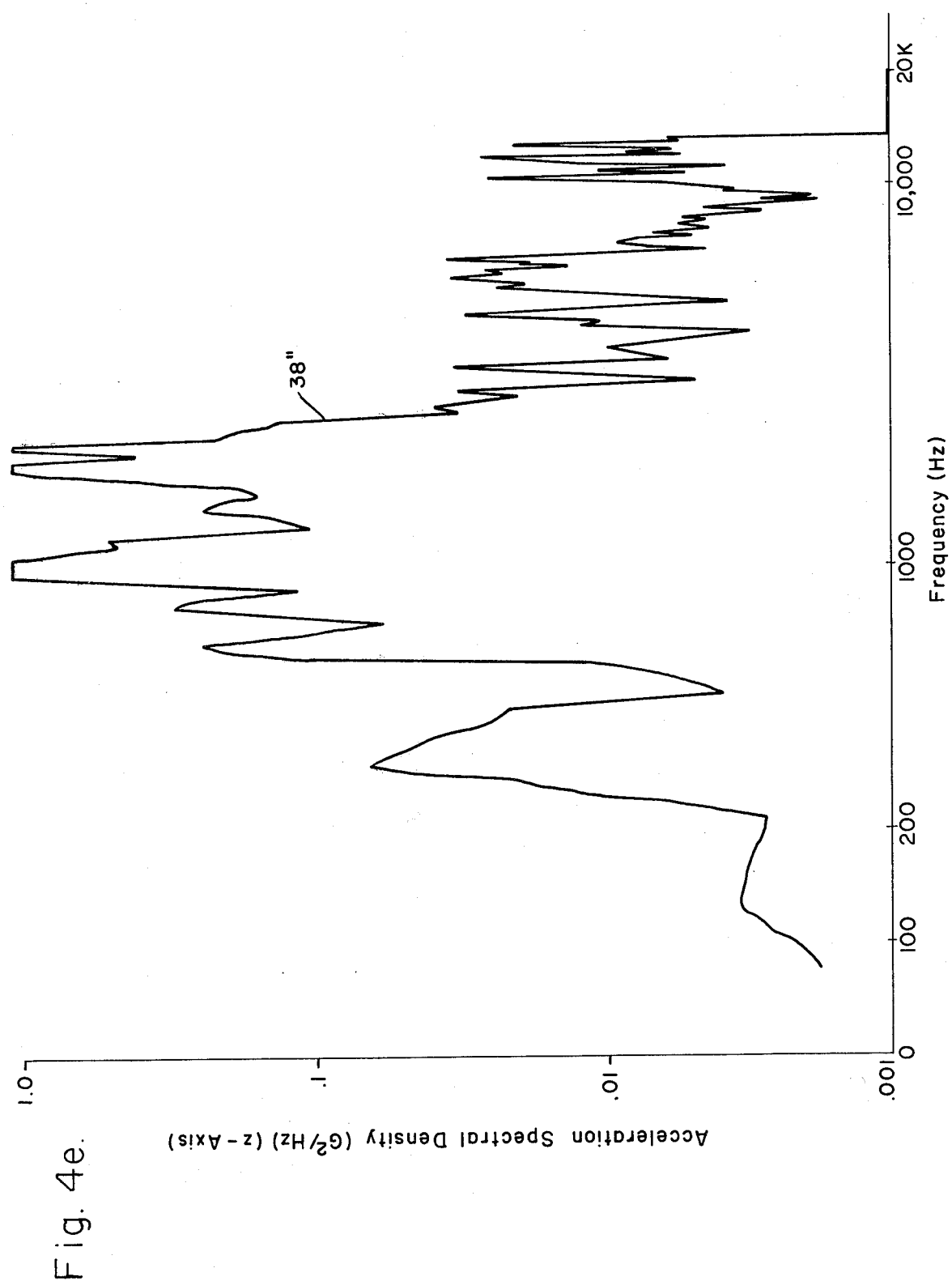
Figure 4F:
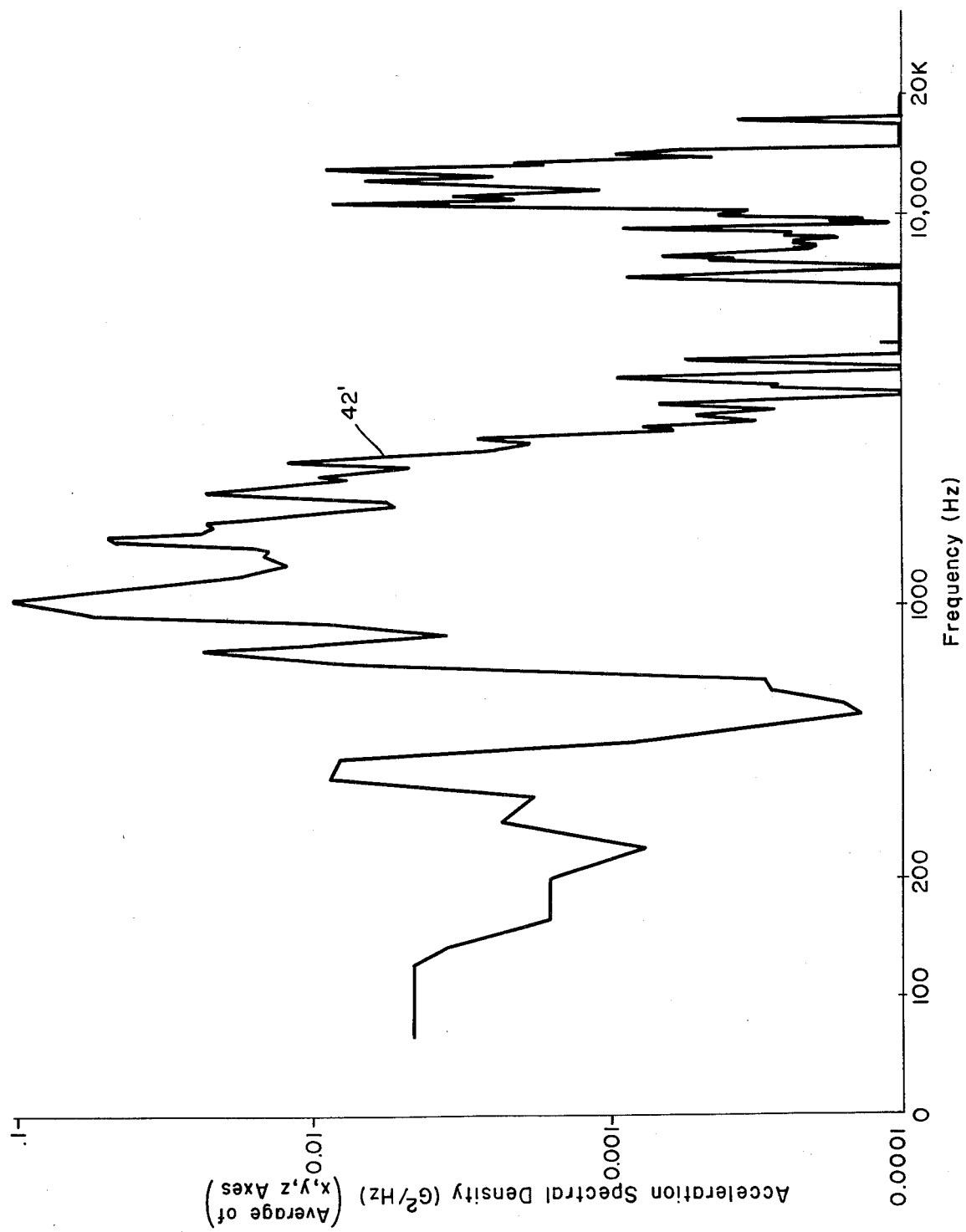

With reference also to FIGS. 2 and 3a, 3b and as will be more fully described below with respect to FIGS. 7-10, and FIGS. 11-16, respectively, shaker table assemblies 20 of FIG. 1 (20-2 and 20-3 in FIGS. 2 and 3) include a plurality of pneumatic vibrators collectively identified by indicium 34 (34-2 and 34-3) which are coupled to a driving structure 36 (36-2 and 36-3) to impart vibratory inputs thereto, as noted in FIGS. 2 and 3. The entire assembly is supported at or near driven structure node points on isolators 37. The driving structure is caused to assume varying modes of vibration based upon forced harmonic response to the excitation inputs from the vibrators in conjunction and on natural multimodal response of the structure due to the specifically designed physical configuration and material properties, which are typically of aluminum and/or magnesium. The dynamic distortions, which result from the many modes of forced and natural vibration and which are greatly exaggerated as shown in FIGS. 2 and 3a, 3b, are modified and transmitted to a driven structure 38 (38-2 and 38-3) by means of a visco-elastic construction 40 (40-2 and 40-3) having, for example, resilient components 40a (40a-2 and 40a-3) and damping components 40b (40b-2 and 40b-3). Driven structure 38 (38-2 and 38-3), therefore, will assume complex modes of dynamic distortion composed of multimodal space-frame dynamics imposed on multimodal plate behavior, also which are shown in exaggeration in FIGS. 2 and 3a, 3b and which are superpositions of forced and natural vibration modes of driven structure 38 (38-2 and 38-3) and of the dominant modes imparted from driving structure 36 (36-2 and 36-3). The maximized coupled multimodal response between the driving and the driven structures is assured by situating the connecting pivots of the space frame at the most frequently repeatable anti-node (maximum displacement) stations of the structure sets.

Accompanying the structure illustrated in FIGS. 2 and 3a, 3b and depicted in FIGS. 4a-4f are representative curves depicting the relationship between acceleration spectral density, in $G^2/Hz$, and frequency, in Hz, with curve 34' measured normal to the piston axis of a pneumatic vibrator 34 (34-2 and 34-3), with curves 36' and 36" showing the acceleration spectral density graphs respectively in the "x" and "z" directions for driving structure 36 (36-2 and 36-3) near the vibrator, with curves 38' and 38" showing the acceleration spectral density graphs respectively in the "x" and "z" directions for driven structure 38 (38-2 and 38-3) opposite the point on driving structure 36 (36-2 and 36-3) from which the data for curves 36' and 36" was taken, and with curve 42' measured at test item 42 (42-2 and 42-3) depicting the vibrations in three directions applied thereto. The vibrational output from driven structure 38 (38-2 and 38-3) is sensed by accelerometers 44 which are fed into feedback and overtest protective subsystem 28.

The basis of the mechanical vibration device embodied in shaker table assembly 20 (20-2 and 20-3) is that a structure can be excited in many translational and rotational vibration modes, dominated by multiples of both the excitation frequency and the natural frequencies of the structure. The frequencies of the first few natural modes of the structure embodied in driving structures 36 (36-2 and 36-3) are by design not integer multiples of the primary excitation frequency obtained from pneumatic vibrators 34 (34-2 and 34-3) to insure a power equality in forced and natural spectra. The complex modal coupling between initially excited structure 36 (36-2 and 36-3) and driven structure 38 (38-2 and 38-3) results in a rich composite of vibratory modal history arising from individual and unified structures behavior as modified by visco-elastic coupling 40 (40-2 and 40-3). Test item 42 (42-2 and 42-3) is subjected to the resulting vibration spectrum. The means by which driving structure 36 (36-2 and 36-3) and driven structure 38 (38-2 and 38-3) are coupled makes it possible to obtain a controllable power spectrum, with specific acceleration level limits from 40 Hz to 2 kHz, which are limits of vibration frequency for typical military specifications. The elastomeric materials of construction 40 (40-2 and 40-3) have specifically tailored shapes and properties and are inserted with associated mechanisms between the driving and driven structures. The visco-elastic transmissibility and filtering characteristics of the chosen elastomers allow a roll-off of the vibration acceleration spectrum input to the test article at or near the upper frequency limit, regardless of the high frequencies excited in driving structure 36 (36-2 and 36-3).

Vibrators 34 (34-2 and 34-3) preferably comprise impacting free-piston pneumatic vibrators rather than air-cushioned free-piston pneumatic vibrators, rotary pneumatic vibrators or otherwise operated vibrators, such as by hydraulic and electro-mechanical means, but those can be used if the desired types of dominant vibrational frequencies are obtainable therefrom. Impact vibrators are preferred so that the sliding piston therein impacts on at least one of the vibrator housing end surfaces after the drive gas pressure reaches some threshold. This impact gives rise to a repeatable chain of mechanical vibratory transients that are rich in harmonic content having a very broad spectral characteristic, typically covering range from about 50 Hz to several thousand Hertz, the upper limit depending largely on the resonant characteristic of the structure on which the vibrator is mounted. It is preferred also to use different sizes and combinations of vibrators characterized by different rigid body fundamental frequencies for a given gas pressure in conjunction with the structural frequency response of the shaker components and the mass thereon. The gas pressure determines the fundamental or lowest repetition rate and the resulting impact force level.

Uniform vibrational energy coupling between the shaker elements is desirable at every frequency between the lowest attainable frequency and approximately 2 kHz. However, much of the input energy is concentrated around multiples of the fundamental rigid body frequency of the free piston vibrators. This condition dictates a requirement for modulation of the drive pressure sufficient to cause an excursion of the fundamental pulse repetition frequency of 25% to 50% about the nominal. Such excursion causes a "smearing" of the frequency spectrum and assures that there is sufficient vibrational energy present for a predictable percentage of the test time at every frequency without causing a "lock-on" at any given frequency.

While the following description of the system illustrated in FIG. 1 in the next several paragraphs is set forth in some detail, it is not intended that such detail be or comprise the main inventive embodiment of this disclosure. Such detail is included solely for completeness of the disclosure, especially with regard to optimizing operation of the claimed invention.

As stated above, pneumatic vibrators 34 (34-2 and 34-3) are actuated by air pressure and flow control mechanism 22. Specifically, each vibrator is connected to a solenoid operated air valve 48. Each air valve 48 is maintained in an open position during operation of the system, and each is coupled to a drive manifold 52 for uniform supply of air equally to all solenoid valves. Solenoid valves are electrically operated by appropriate drive circuitry 50 which is coupled to micro-processor 26 through hardward protection circuitry 32. In the event that an overtest or other damaging conditions arise, hardware protection circuitry 32 opens the circuit between micro-processor 26 and drive circuitry 50 to close solenoid valve or valves 48 and thereby prevent air from being supplied to vibrator 34. In such a manner, vibratory input to shaker table assembly 20 is terminated. The signal from drive circuitry 50 also causes an atmospheric vent 51, coupled to drive manifold 52, to open, thus permitting release of pressure therefrom.

Drive manifold 52 comprises a plenum to insure a uniform flow of air equally to all vibrators. Air pressure switches 54 and switch inputs 56 are coupled in series between drive manifold 52 and micro-processor 26 and may be used for one or more purposes. They can act as limit switches to cut off the flow of air to the manifold in the event that the air pressure drops below a preset pressure, to cut off air flow if the pressure is too high, and to assure that the pressure is adequately high in the drive manifold prior to commencement of the test.

Air to drive manifold 52 is supplied through a variable area orifice 58. Its purpose is to vary the drive manifold pressure level with respect to time so that a greater or lesser amount of air will be supplied to pneumatic vibrators 34 which, in turn, will then cause different levels of vibration to be exerted against driving structure 36. Variable-area orifice 58 is driven by a flow-control mechanism 60 which, in turn, is driven by variable-flow control drive circuitry 62 from microprocessor 26.

The general pressure level of air over a larger period of time than that furnished to variable-area orifice 58 is controlled by an air-pressure regulator 66 which, in turn, is controlled by a regulator servo 68 and air-pressure regulator servo drive circuitry 70 operated from microprocessor 26. Limit switches 72 to prevent overtravel of its mechanism. The purpose of air-pressure regulator 66 is to insure that an unvarying flow and pressure of air be supplied to variable-area orifice 58 over a relatively long period of time.

Air is supplied to regulator 66 from an air supply 74, and the air is filtered through an air filter 76.

In further partial explanation of the operation of the system, before vibrational testing of test item 42 occurs, the pressure in drive manifold 52 is sensed through air pressure switches 54 so that air pressure regulator 66 can be set to supply that pressure and quantity of air which is required by variable area orifice 58, which is monotonically related to the vibrational excitation required. After the start of the test, the average of the acceleration levels for a set period of time, e.g., 2½ minutes, is sensed by accelerometers 44 to operate air pressure regulator 66. Meanwhile, the program input from microprocessor 26 to variable area orifice 58 continues at a rapid pace, e.g., 2¾ seconds per pressure change. The variable area orifice is varied rapidly while the average acceleration levels are taken intermittently, in order to change the pressure of air supplied to the rapidly changing orifice size, so that the average acceleration response (Grms) is increased.

Coupled with this operation, regulator and orifice limit switches 72 and 64 are actuated to prevent signals from operating the servos beyond what is desired, as well as to so, forward this information to the microprocessor.

The operation of feedback and overtest protective subsystem 28 is as follows. Subsystem 28 receives signals from accelerometers 44 and provides two functions, a first being overtest protection and the second being notification of vibration test information to the microprocessor.

This latter function employs low-pass filter and sample-and-hold function 46, a multiplexer 140, and an analog-to-digital converter 142. Their purpose is to digitize the analog signal from the selected accelerometers for the purpose of determining the root-mean-square acceleration level of the test item. For a multi-axis screening facility, an average of two to six accelerometer signals from at least two and preferably three of the three orthogonal directions is required. Multiplexer 140 permits handling of signals simultaneously from more than one axis. In operation, microprocessor 26 through line 143 addresses the sample-and-hold function in component 46 to have it either sample or hold the analog accelerometer signal, as well as to address multiplexer 140 to select the channel or accelerometer signal applied to analog-to-digital converter 142. A channel selector 145 determines the number of accelerometer channels which microprocessor 26 is to address to multiplexer 140.

As shown in FIG. 1, subsystem 28 has a secondary function to provide for overtest protection, utilizing auxiliary multiplexers 144, a peak detector 146, and an overtest protective function 148. These components are of conven-tional design. In operation, channel selector 145 determines the number of accelerometer channels which auxiliary multiplexer 144 scans so that unfiltered signals from accelerometers 44 are properly fed to these components and therefrom to hardware protection circuitry 32. In the event that the vibrational level of shaker table assembly 20 becomes too great, as sensed by accelerometers 44, this information is processed to permit hardward protection circuitry 32 to interrupt the operating signal from microprocessor 26 to solenoid valves 48, thereby to prevent further supply of air to pneumatic vibrators 34.

Air pressure switches 54 are used to determine what the drive manifold pressure is and to preset the pressure at a desired level. At least two switches are utilized for nominal and low pressure, respectively to preset the pressure and to turn the test off at a selected low pressure to prevent vibration below a particular switch setting. If desired, a high pressure switch may be used to prevent vibration above a specified level.

The operator interface subsystem, denoted generally by indicium 30, is coupled to microprocessor 26 and timing circuitry 150 and embodies those functions which the operator actuates or is displayed. A test enable start/stop function 152 begins or ends the test. A test-time display 154 and a test-level display 156 respectively show the time and the level of RMS acceleration during test. A test-time duration setting 158 and a test-level setting 160 respectively set the duration and level of the test.

Timing circuitry 150 is coupled between microprocessor 26 and hardware protection circuitry 32 for the purpose of enabling the operator to set the duration of the test and to enable the control system to stop the vibration after the test time period has elapsed. The output from the counter is connected to display 154 to indicate the time remaining for the test. Upon reaching zero time at the end of the test period, a signal is sent to hardware protection circuitry 32 which causes the test to stop. The same signal is also forwarded to microprocessor 26.

The purpose of hardware protection circuitry 32 is to interconnect the various failure detect circuitry, the operator inputs, and microprocessor 26. Its failure-detect control is derived from the overtest protective function, the timing circuitry, and the test enable, start and stop functions. When the test is enabled and started, microprocessor 26 has full control of solenoid valves 48, subject to hardware protection circuitry 32. If the overtest protection function 148 detects an overtest condition, for example, the microprocessor loses control of the servo valve. Identical results occur when the timing circuitry times out.

Microprocessor 26 has several functions. It modulates the air pressure, it receives and processes vibrational signals from the accelerometers, and it performs self-tests. Air pressure modulation occurs by varying the orifice area openings of orifice 58. It receives and processes accelerometer signals from accelerometers 44, as first processed by low-pass filter and sample-and-hold function 46, multiplexer 140, and analog-to-digital converter 142, and estimates the Grms level which is displayed on test-level display 156, is compared with internally programmed upper and lower limits to stop vibration if the Grms exceeds the program limits, and is used to adjust air pressure regulator 66. Its self-test is to determine the occurrence of circuitry or mechanical failure or of accelerometer anomalies. Such microprocessors are conventional, an 8-bit microprocessor being suitable.

In operation, the microprocessor is programmed to continuously change the orifice area in variable-area orifice 58 every 1 to 2 seconds in order to preclude shaker table assembly 20 from locking onto any particular vibration, especially a natural mode thereof; thus, the vibrational excitations applied to driving structure 36 are varied every 1-2 seconds and before any prior vibrations have died down. These changes, effected in variable area orifice 58, are pseudo-random and have any desired distribution, e.g., uniform. By pseudo-random, it is meant that there is a mathematical method or algorithm for selecting a sequence of numbers. This sequence is random in the sense that it obeys certain statistical laws of randomness. By pseudo, it is meant that the randomness is not purely random because the sequence results from predetermined calculations. By uniformity, it is meant that every drive manifold pressure is equally likely to be selected. A finite number of opening positions has been selected to be 128, as an example.

Figure 5A:
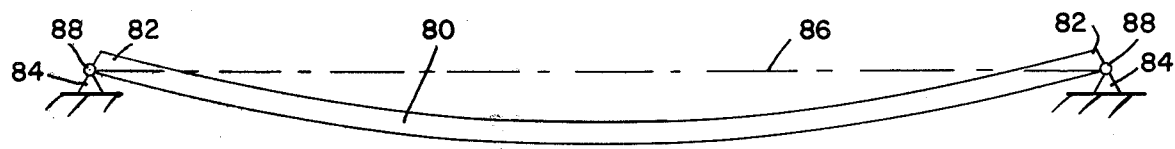
FIGS. 5a and 5b and FIGS. 6a and 6b illustrate modes of free vibration in a simple beam respectively without and with nodal control, hence with and without mode control.
Figure 5B:
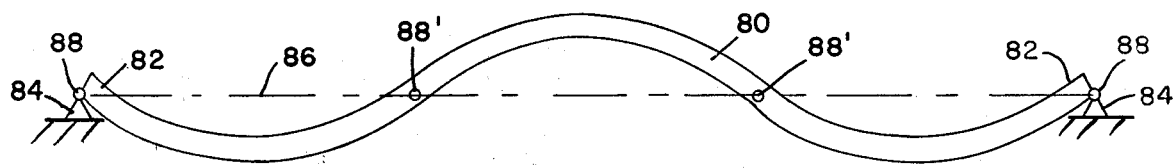

The type of flexure, which occurs in the driving and driven structures depicted in FIGS. 2 and 3, may be better understood with respect to the present application, when taken into conjunction with FIGS. 5a and 5b and FIGS. 6a and 6b. FIG. 5a depicts a simple beam 80 which is attached at its ends 82 to fixed pivot supports 84. FIG. 5a illustrates its first or fundamental mode of free vibration about a center line 86 which is simply at the beam's pivot points 88 which, in turn, defines two nodes. In FIG. 5b, beam 80 is shown in its third mode of free vibration, i.e., its third harmonic, exhibiting two nodes 88' in addition to nodes at pivot points 88 as its passes through center line 86.

Figure 6A:
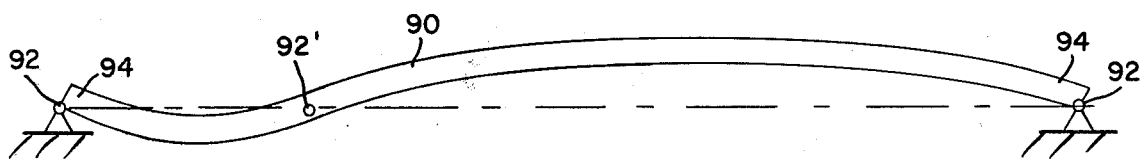
Figure 6B:
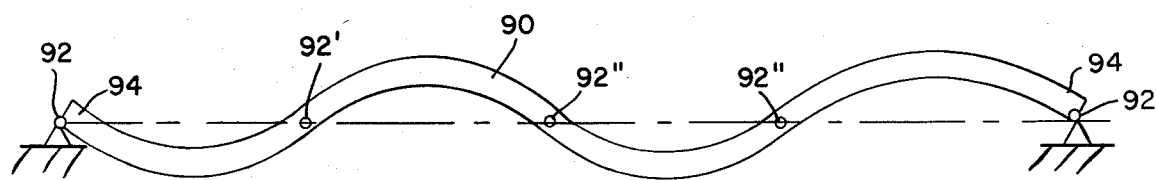

FIGS. 6a and 6b illustrate the same beam, but numbered 90, as depicted in FIGS. 5a and 5b and pivoted at points 92, but with nodal control, that is, a mechanical pivot 92' is introduced any point intermediate its ends 94. Its first or fundamental mode of free vibration (FIG. 6a) exhibits three nodes, a forced node at proof 92' and two nodes at pivot points 92. At its third mode or harmonic of free vibration (FIG. 6b) two additional nodes 92" arise, thus making a total of five nodes. Thus, the beam takes on added dynamic distortion and hence added modal density.

Therefore, by forceably constraining one or more points of a vibrating structure, it is possible to force the vibrational energy into higher modes. As illustrated in FIGS. 5a–b and 6a–b, the points of zero or very low partial relative motion are called nodes, and nodal patterns are established for particular structures from theory and and test. It is thereby possible to forcibly equalize or or bias, by choice, the vibrational power distribution between high and low frequencies. In practice, the nodal constraint may be effected by fixing one or more points or local regions to a fixed support, as indicated above, or if driving and driven structures are utilized as shown in FIGS. 2 and 3, the nodal constraint may be effected by manual insertion of elastomeric pads of greater or lesser stiffness than the chosen elastomeric coupling between driving and driven structures. Spring preloading of adjacent points on driving and driven structures increases the local transmissibility through elastomer interface couplings and allows a manual method of changing frequency characteristics of compliance structure vibration devices.

While manual manipulation means of effecting the nodal constraint may be sufficient for controlling the dynamic behavior of the driving and driven structures between periods of actuation, it is sometimes more useful to effect such nodal constraint during test by means of pneumatic attachments in the elastomeric coupling between the driving and driven structures.

Control is also effected by mechanically, electrically or thermodynamically changing the transmissibility of the vibratory energy passed through the elastomeric oupling in order to alter the frequency content at acceleration levels. Such control makes it possible to use an unaltered elastomer coupling, a common driven structure and basic fixtures for testing of articles of disparate weight and stiffness without ballast or other changes, while permitting changing of acceleration levels of the driven structures.

Such controls include a means for changing the compression and/or shear preload of the elastomeric coupling over complete or extensive areas of contact, for example, by mechanical screw or spring adjustments or by controllable pneumatic preloading by electro-striction or by heating or cooling of the elastomeric material. Such thermal changes make use of highly non-linear variation in the material's stiffness properties as the temperature of the material changed.

Figure 7:
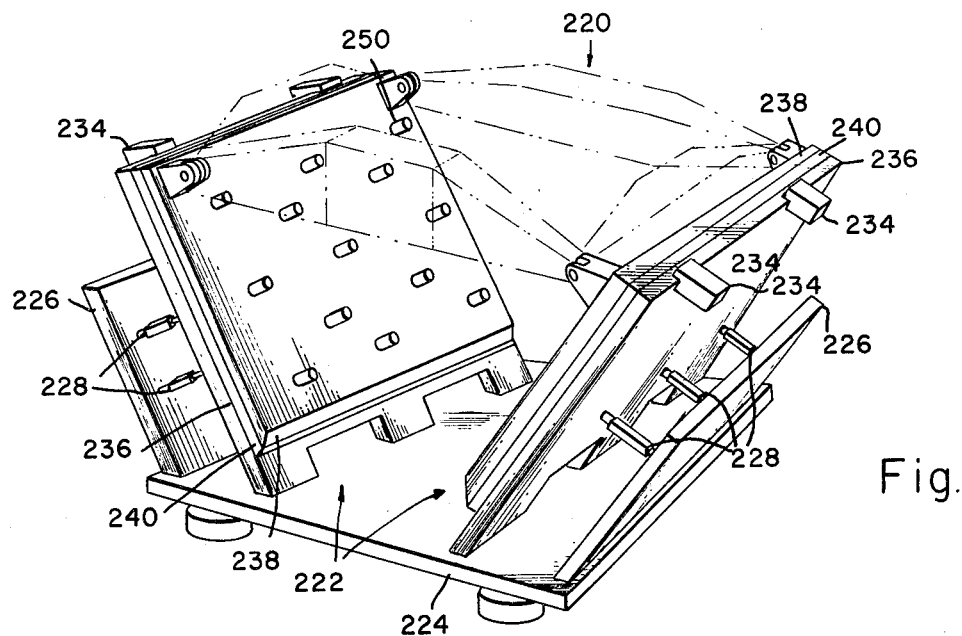
Figure 8:
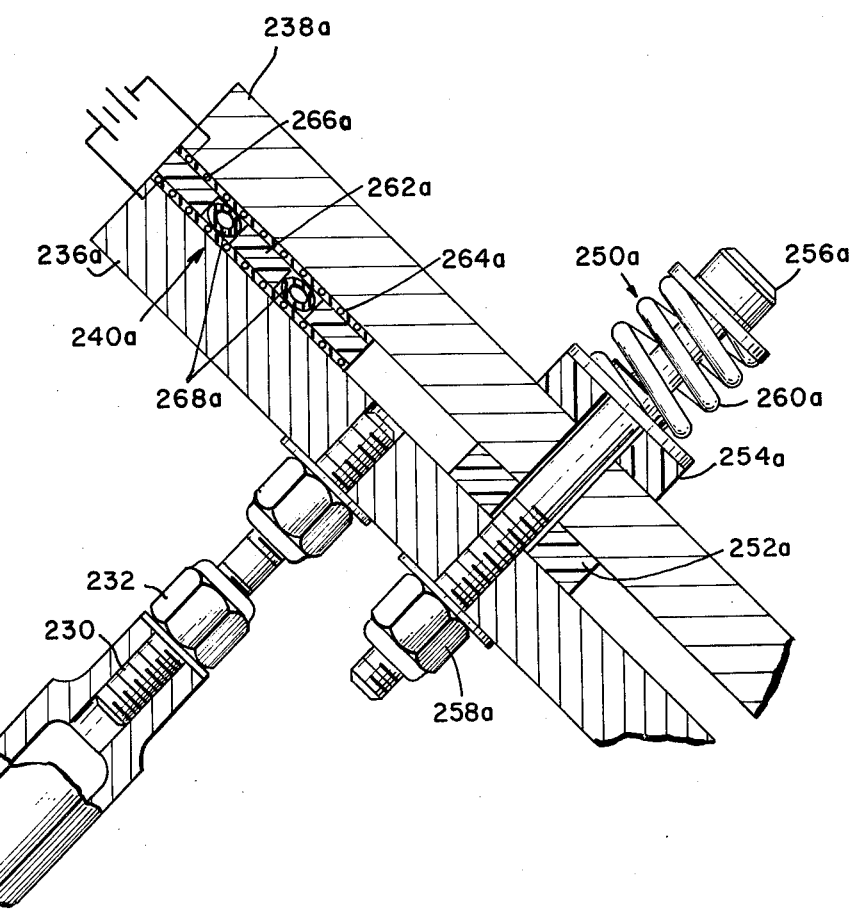
Figure 9:
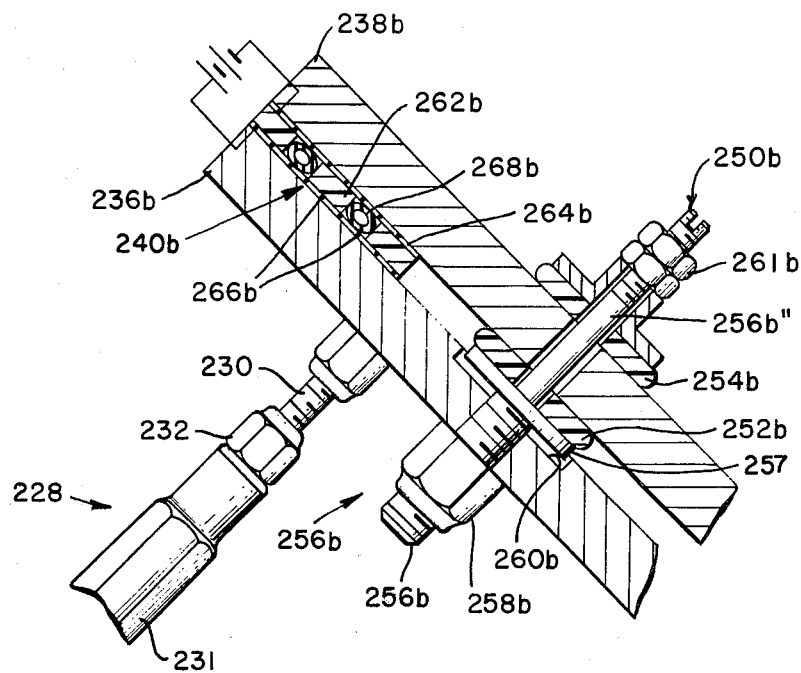
Figure 10:
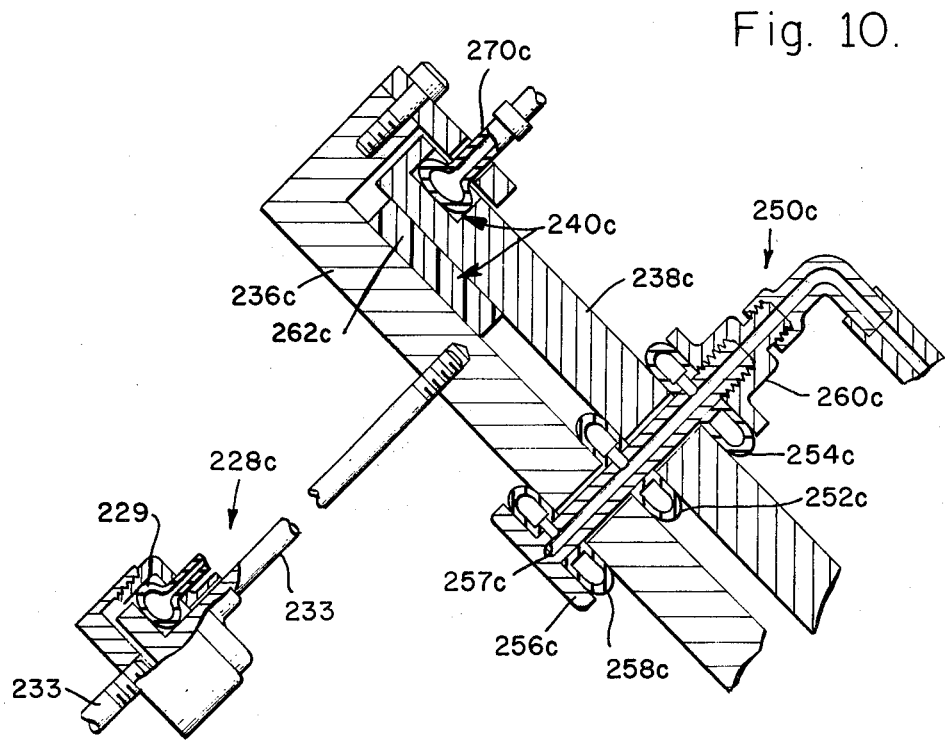

Such controls for the shaker apparatus of co-pending patent application Ser. No. 897,823 are shown, by example, in FIGS. 7–10. FIG. 7 depicts the plate structure thereof, in particular, the skewed V-shaped shaker assembly. As also disclosed in co-pending application Ser. No. 897,823, a pair of plate structures 222 include a driving plate 236, a driven plate 238, and shaped elastomeric coupling 240 therebetween. Structures 222 are secured to a common connection 224 also having fixed sides 226. Points or regions on driving plates 236 are forceably constrained by one or more couplings 228 between driving plates 236 and fixed sides 226. Such couplings 228 are depicted in FIGS. 8 and 9 as manually adjustable turnbuckles 230. In FIG. 10, couplings 228c are pneumatically adjustable by use of a bladder 229 joining coupling halves 233.

Control of the elastomeric connection between driving and driven plates 236 and 238 is shown as comprising interplate nodal control devices 250. These devices are illustrated, by way of example, in the three configurations shown respectively in FIGS. 8, 9, and 10. In FIG. 8, interplate nodal control device 250a comprises an elastomeric grommet 252a sandwiched between driving and driven plates 236a and 238a and a grommet 254a placed on the exterior of driven plate 238a. A bolt 256a extends through the two plates and the grommets and, with a nut 258a, holds the assembly together. Appropriate spring loading is effected by a spring 260b placed between the bolt head and a washer on grommet 254a.

In FIG. 9, control is effected by means of a control gap 260a placed between driving and driven plates 236b and 238b. Here, control device 250b includes a pair of elastomeric grommets 252b and 254b forming a sandwich with driven plate 238b and a washer 257. A bolt 256b with a double diameter shank 256b' and 256b'' extends through both plates. Washer 257 is threadedly secured to bolt shank 246b' against grommet 252b, and a nut 258b on shank 256b' resting against plate 236b maintains the thickness of gap 260b. A pair of jam nuts 261b on shank 256b'' determines the compressive forces exerted on grommets 252b and 254b.

In FIG. 10, inter-plate nodal control device 250c includes a pneumatic adjustment employing a special bolt 256c with an air passage 257c therein. The air pressure is coupled to air cells 252c, 254c and 258c which form a sandwich structure with driven and driving plates 236c and 238c. Air pressure is applied to the air cells through a threaded cap 260c and related structure.

While mechanical or pneumatic control is shown by inter-plate nodal control devices 250a, 250b, and 250c, thermo-cynamic control of the elasticity of the elastomers is depicted in FIGS. 8 and 9 for elastomeric assemblies 240a and 240b. In both cases, the elastomeric structures include elastomers 262a and 262b sandwiched between the driving and driven plates by variable transmissibility elastomer coupling 264a and 264b having heater wires 266a and 266b therein in order to soften the elastomeric materials and, thereby, to reduce acceleration levels therein. To stiffen the elastomeric materials, refrigerant passages 268a and 268b are placed therein to harden the materials and, thereby, to achieve correspondingly higher acceleration levels.

In FIG. 10, elastomeric coupling structure 240c includes elastomeric material 262c and a continuous air bladder 270c, both being placed between driving and driven plates 236c and 238c. By introducing a greater or lesser amount of air into bladder 270c, elastomer 262c can be pneumatically preloaded to control the loading on elastomeric material 262c.

Similar methods are depicted as examples for the structures of above-referenced co-pending patent application Ser. No. 897,824, depicted in FIGS. 11-16. As shown in FIG. 11, shaker assembly 320 comprises annular driving structure 336 and driven structure 338, with elastomeric coupling therebetween, shown generally in FIGS. 12-16 by indicum 340a, 340b, and 340c. In a manner as similarly shown previously, fixed sides 326 are selectively coupled to driving structure 336 by one or more turnbuckles 328 to prevent or limit local displacement of the driving plate in order to affect its vibration response. Such control is a fixed control as depicted in FIGS. 11 and 12; however, device 328c of FIG. 14 illustrates pneumatic control by a piston assembly 328 to effect in-process vibration control.

The elastomeric couplings between the driving and driven structure in FIGS. 12 and 13 are effected by inter-plate node control devices 350a and 350b, which are similar in construction. Each comprises respectively a bolt 356a and 356b extending through an enlarged opening 353a and 353b in driven rings 338a and 338b and into engagement with driving rings 336a and 336b. The bolt to driven ring coupling is spring biased by springs 360a and 360b for adjusting the compression exerted to elastomers 354a, 354b, and 352a, 352b. Device 350a utilizes a fixed threaded connection 358a with driving ring 336a while in FIG. 13 device 350b uses a spherical nut 358b in driving structure 336b.

Figure 16:
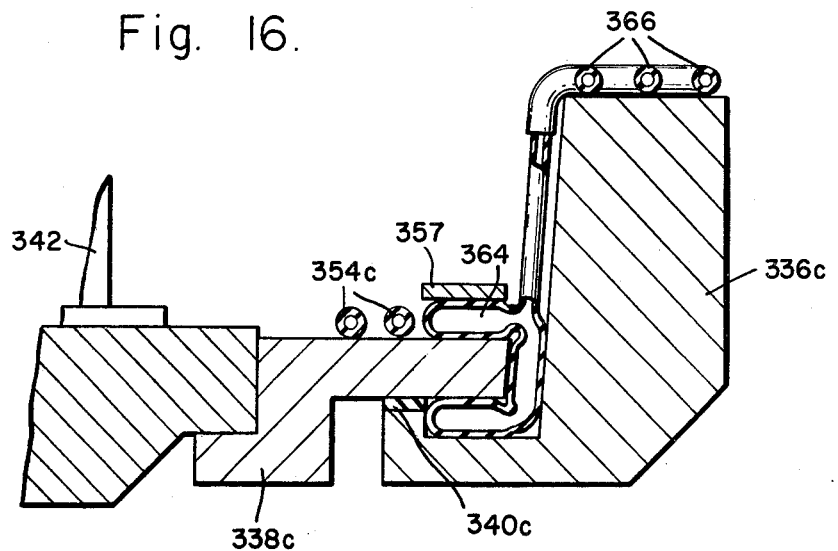
Figure 14:
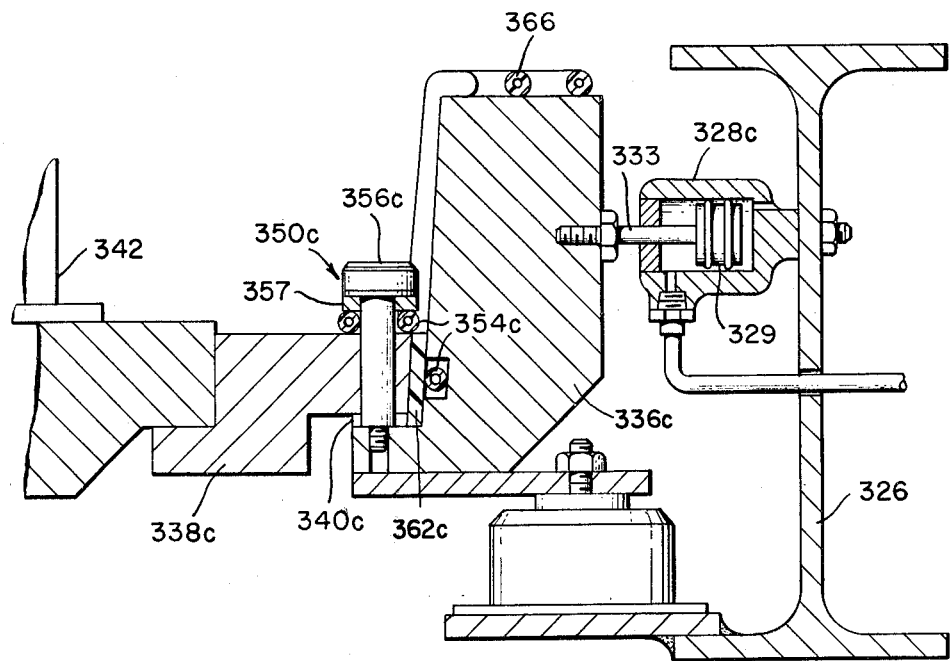
Figure 15:
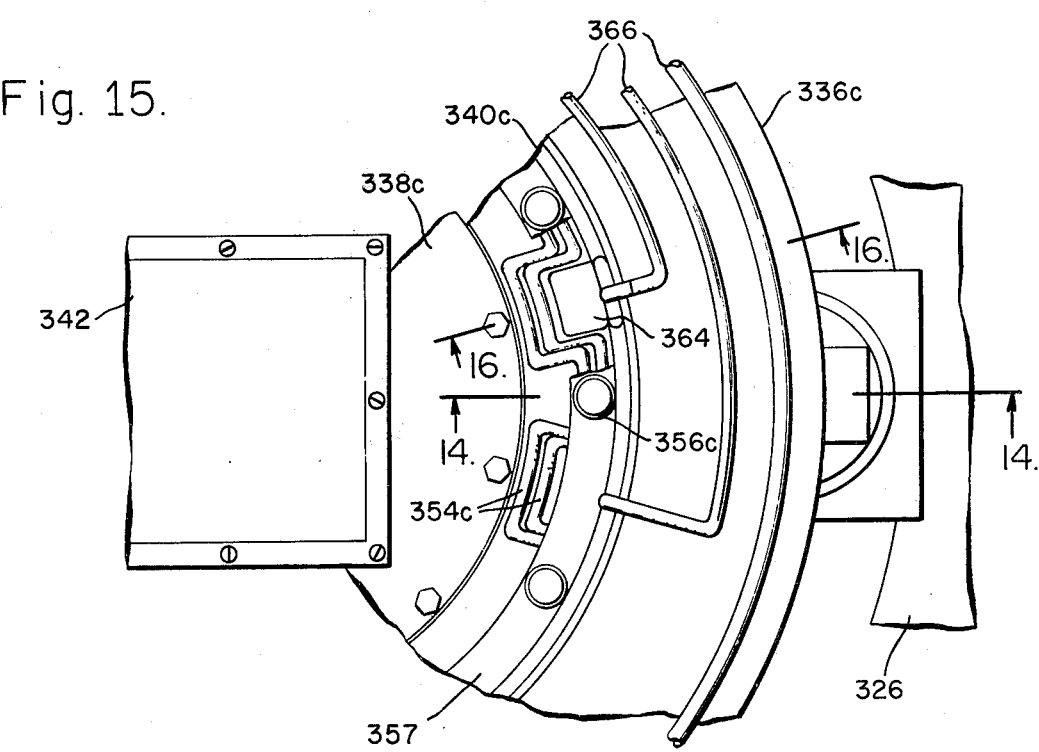

Pneumatic control is depicted in FIGS. 14-16. Inter-plate node control device 350c includes elastomers 362c between the driving and driven plates and continuous or seqmented annular, controlled inflation tubes 354c, the latter being sandwiched between a bolt 356c and driven ring 338c between driving ring 336c and driven ring 338c and the latter being sandwiched between the driving ring and test item 342. Bolt 356c threadedly engages driving plate 336c to retain retainer ring 357. These elastomers and tubes act to control the power intensification between the driving and driven plates by virtue of pressure on the elastomer changing the nonlinear stiffness property of the elastomer to increase local transmissibility.

As further shown in FIGS. 15 and 16, the power intensification means includes a series of air cells 364 placed completely about the three edge surfaces of driven ring 338c. Separate manifold lines 366 extend to the air cells to effect selective nodal control throughout the annular interface between the driving and driven plates and to effect power intersification using inflation tubes 354c with or without air cells 364.

Figure 17:
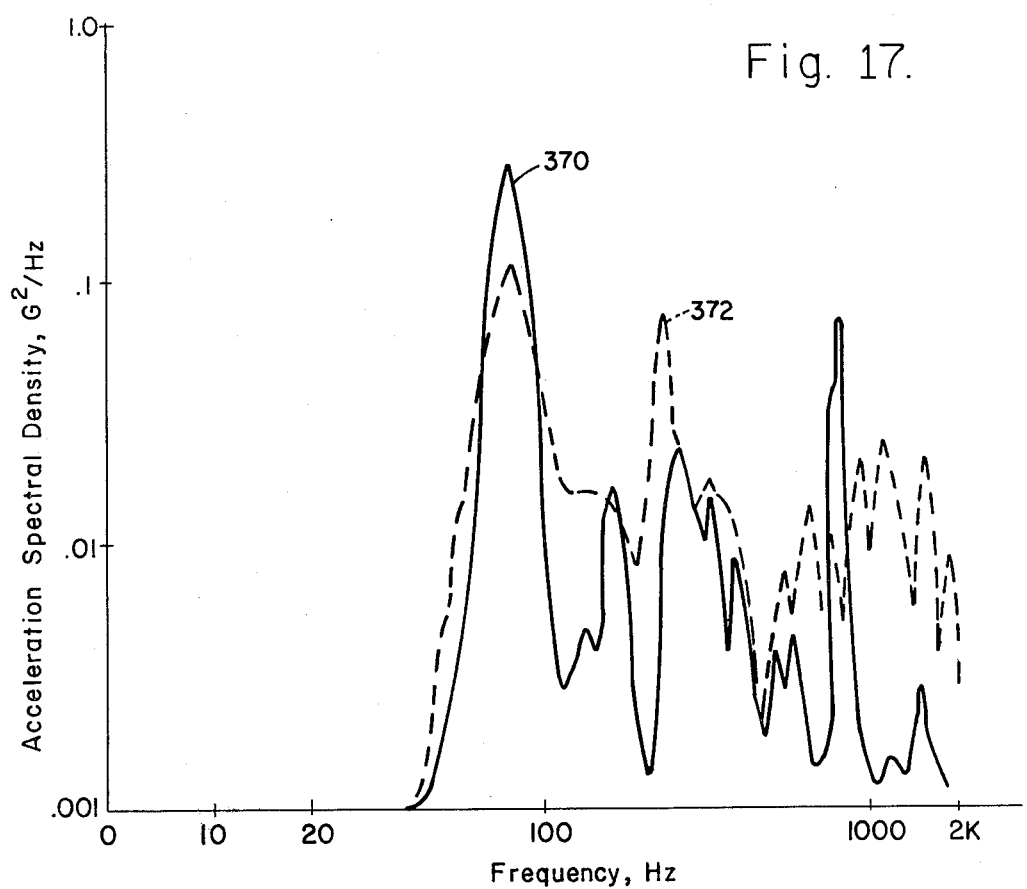
FIGS. 17 and 18 are graphs of power spectral density comparison in the second embodiment depicted in FIGS. 9–14 along its vertical axis, respectively with and without node control and with and without coupling power intensification.
Figure 18:
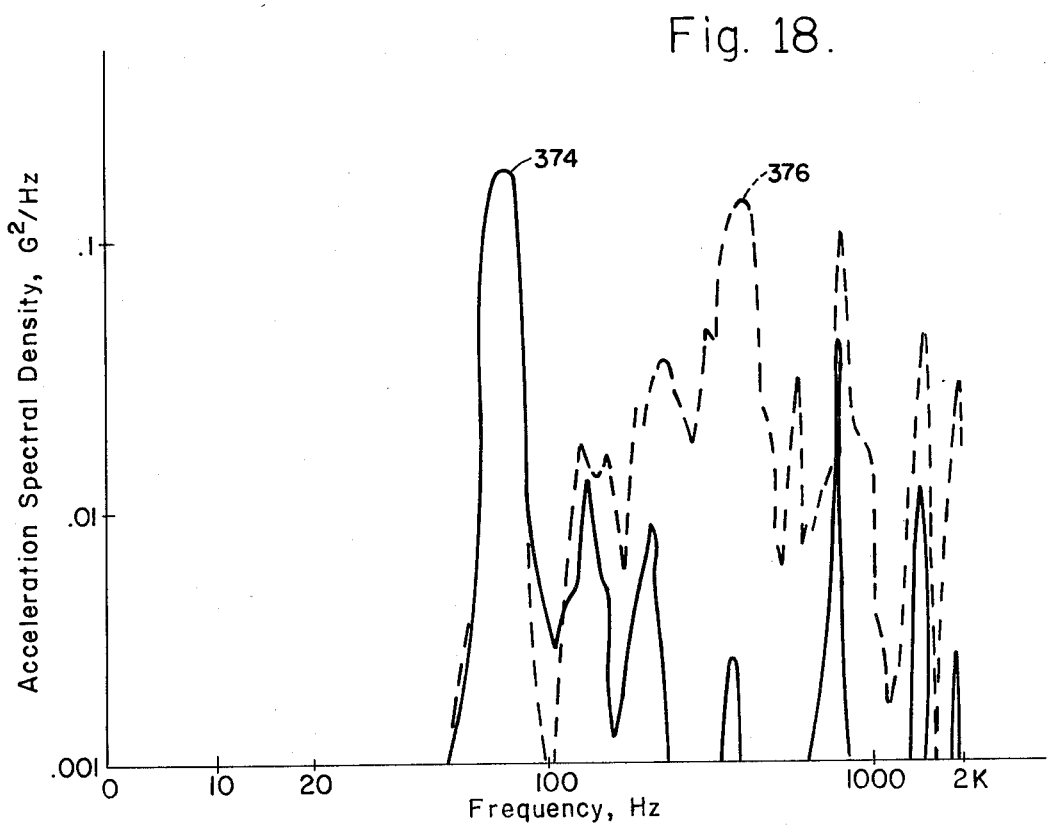

Results of operation of these systems are depicted in FIGS. 17 and 18. FIG. 17 depicts the power spectral density comparison of the annular vibrator driven structure in vertical axis, with and without simple mechanical node control. Solid curve 370 represents eight pneumatic vibrators operated at 50 psig using a uniform silicon foam elastomer coupling. Curve 372 in the result using four pneumatic vibrators at 50 psig with a foam silicon elastomer coupling, interrupted by rubber pads spacing.

In each representation of means for control, the means may be automatic or manual in nature.

FIG. 18 depicts the power spectral density comparison of the annular vibrator driven structure in vertical axis, with and without coupling power intensification. Curve 374 resulted from use of eight pneumatic vibrators at 40 psig with elastomeric coupling at zero preload. Dashed curve 376 shows the result of utilizing the same configuration but with 0.25 inch compressive preload on the coupling.

Although the invention has been described with reference to particular embodiments thereof, it should be realized that various changes and modifications may be made therein without departing from the spirit scope of the invention.

What is claimed is:

1. A vibration control system including:
a shaker for vibration testing of a test item comprising a driving structure, a driven structure supporting the test item, a visco-elastic structure coupling said driving and driven structures together for establishing vibration modal characteristics of said driving structure and of said driven structure cooperating with said driving structure, and means coupled to said driving structure for imparting vibratory excitations thereto; and vibration controlling means coupled to said shaker and cooperating therewith for controlling characteristic vibratory excitations imparted to said test item by controlled alteration of the modal characteristics.

2. A system according to claim 1 wherein said visco-elastic structure has inherent stiffness and damping characteristics, and said vibration controlling means further includes means coupled to said visco-elastic structure for controlling and altering its stiffness and damping characteristics.

3. A system according to claim 2 wherein the vibratory excitations imparted to said test item exhibit a spectral content in terms of frequency and accelerations, and wherein said elastomeric materials have non-linear transmissive properties and, together with said vibration controlling means, are placed at selected locations between said driving and driven structures for selectively controlling the transmissibility of the vibratory excitations thereby for changing limits of the accelerations over a selected frequency range and for selectively inhibiting transmission of the vibratory excitations beyond the selected frequency range.

4. A system according to claim 3 wherein said visco-elastic materials are disposed in cooperation with said vibration controlling means in selected configurations which, with the modal characteristic alteration, modify the acceleration limits.

5. A system according to claim 4 further comprising means for modifying contact pressure on said visco-elastic structure.

6. A system according to claim 5 wherein said modifying means comprises pneumatic tubes acting on said visco-elastic structure by exerting pressure thereon.

7. A system according to claim 5 wherein said modifying means comprises heating and cooling means for changing the elasticity thereof.

8. A system according to claim 2 or 4:
wherein said driving and driven structures respectively comprise plates and said vibratory excitation imparting means comprise a plurality of vibrators; and
further comprising a pair of interconnected non-coplanar plate structures, each including a sandwiched construction of said driving plate, said driven plate, said visco-elastic structure and at least some of said controlling means, with at least one of said vibrators secured to each of said driving plates for causing each of said driving plates to vibrate in multiple plate bending modes and to impart substantially one dimensional displacements at each of said visco-elastic coupling interfaces, thereby for causing the displacements to occur at many different rates and amplitudes at said coupling interfaces by said vibration controlling means.

9. A system according to claim 8 wherein said non-coplanar plate structures have a V-shaped configuration defining spaced apart upper edges and lower edges with said driving plates at said lower edges secured to a support, and further including a flexible space frame coupling said driven plates near corners at said spaced apart upper edges together for supporting the test item.

10. A system according to claim 9 wherein:
said V-shaped configuration of said non-coplanar plate structures has substantially constant cross-section throughout their lengths, and
said flexible space frame is substantially symmetrical for creating displacements of said space frame at its couplings to said non-coplanar plate structures for superpositioning interacting characteristics of the vibratory excitations of said flexible symmetrical space-frame,
thus resulting in a planar, three-degree-of-freedom displacement-time history at the test item.

11. A system according to claim 9 wherein:
said non-coplanar plate structure are skewed with respect to one another for skewing said V-shaped configuration, and
said flexible space frame is substantially assymetrical for creating non-coplanar displacements of said space frame at its couplings to said non-coplanar plate structures for superpisitioning interacting characteristics of the vibratory excitations of said flexibility assymmetrical space-frame,
thus resulting in a six-degree-of-freedom displacement-time history at the test item.

12. A system according to claim 8 wherein said vibrators comprise pneumatic vibrators, and further including means including an air supply for driving said pneumatic vibrators.

13. A system according to claim 2 or 4 wherein said driving and driven structures respectively comprise rings for defining, with said visco-elastic structure and at least some of said controlling means, a concentric sandwich structure, with said vibratory excitation imparting means causing said driving ring to vibrate in multiple bending and torsional modes and to impart displacements at many different rates and amplitudes along the length and breadth of said visco-elastic coupling interfaces, thereby for causing a multi-degree-of-freedom multi-phase multimodal displacement-time history at the test item.

14. A system according to claim 13 further including a platform supporting the test item for coupling said driven ring with the test item.

15. A system according to claim 13 wherein said vibratory excitation imparting means comprise pneumatic vibrators, and further including means including an air supply for driving said pneumatic vibrators.

16. A system according to claim 2 further including means between said driving structure and a relatively rigid support to which said shaker is secured and between said driving and driven structures respectively for selectively restraining vibrational displacements of said driving structure and for selectively restraining relative vibrational displacements between said driving and driven structures for producing partial and full node points thereon, thereby for increasing fundamental frequencies and harmonics thereof caused by the vibratory excitations and for altering the modal density and frequency content of the spectra.

17. A system according to claim 3 wherein said controlling means comprises means for forceably creating nodes and partial nodal lines between said driving and driven structures.

18. A system according to claim 17 wherein said changing means comprises variable stiffening couplings selectively placed between said driving structure and a rigid support to which the shaker is coupled to produce node points.

19. A system according to claim 18 further including air cells positioned at least between said driving and driven structures.

20. A system according to claim 19 wherein said air cells annularly surround bolts attaching said driving and driven structures and further including an air passage through said bolts for supplying air to said air cells.

21. A system according to claim 17 wherein said rigidifying couplings include a pressure-controlled piston for determining the degree of rigidity between said driving structure and said rigid support.

22. A system according to claim 21 wherein said pneumatic preloading comprises air bladders between said driving and drive structures acting to compress and extend said visco-elastic structure.

23. A system according to claim 21 wherein said controlling means comprises elastomeric grommets placed on either side of said driven plate, with one grommet in contact with said driving plate, with a bolt extending through said grommets and said drven structure into said driving structure.

24. A system according to claim 23 further including spring loading between a head a said bolt and one of said grommets.

25. A system according to claim 23 further including means defining a control gap between said driving and driven structures spaced by means on said bolt and one of said drving and driven structures.

26. A system according to claim 25 further including jam nuts on said bolt for determining the amount of compressive forces excited on said grommets.

27. A system according to claim 3 wherein said controlling means comprises means between said driving and driven structures for intensifying power transmitted to said test item by forceably increasing acceleration transmissibility from said driving structure and through said driven structure to said test item.

28. A system according to claims 17 or 27 wherein said controlling means includes means for mechanically, electrically and/or thermally changing the resiliency of said visco-elastic structure.

29. A system according to claims 17 and 27 wherein said controlling means includes means for changing the compression and/or shear load of said visco-elastic structure over at least parts of the coupling between said driving and driven structures.

30. A system according to claim 29 wherein said changing means comprises mechanical screw adjustments, mechanical spring adjustments, pneumatic preloading and electro-striction, heating and cooling of said elastomeric materials.

31. In a vibration system having means for supporting a test item including a driving structure, a driven structure supporting the test item, and a visco-elastic structure coupling said driving and driven structures; vibrators coupled to said driving structure and operable with said supporting means for generating quasi-random, simultaneous multi-axis vibration in the test item; means coupled to said vibrators for automatically causing said vibrators to vary their vibratory output and thereby for enhancing the randomness in the multi-axis vibration; and means defining a closed loop with the multi-axis vibration and said vibrators for sensing and controlling the level of the multi-axis vibration, the improvement comprising:

means coupled to said visco-elastic, driving and driven structures for controlling the characteristics of the coupling between said driving and driven structures and the vibratory excitations imparted to the test item through said driving, driven and visco-elastic structures.

* * * * *